(12) United States Patent
Otake

(10) Patent No.: US 7,123,327 B2
(45) Date of Patent: Oct. 17, 2006

(54) SUBSTRATE FOR REFLECTIVE-TRANSMISSIVE ELECTRO-OPTICAL DEVICE HAVING OPENING IN BASE LAYER VARYING IN SIZE ALONG A FIRST DIRECTION

(75) Inventor: Toshihiro Otake, Okaya (JP)

(73) Assignee: Seiko Epson Corporation, (JP)

( * ) Notice: Subject to any disclaimer, the term of this patent is extended or adjusted under 35 U.S.C. 154(b) by 67 days.

(21) Appl. No.: 10/924,244

(22) Filed: Aug. 20, 2004

(65) Prior Publication Data

US 2005/0062912 A1    Mar. 24, 2005

(30) Foreign Application Priority Data

Aug. 25, 2003    (JP)    ............................. 2003-300037

(51) Int. Cl.
*G02F 1/1335* (2006.01)
*G02F 1/1343* (2006.01)

(52) U.S. Cl. ..................... 349/114; 349/106; 349/138

(58) Field of Classification Search ................ 349/114, 349/122, 138
See application file for complete search history.

(56) References Cited

U.S. PATENT DOCUMENTS 6,195,140 B1 * 2/2001 Kubo et al. ..................... 349/44

6,927,820 B1 * 8/2005 Jang et al. ..................... 349/114

FOREIGN PATENT DOCUMENTS

| JP | 2000-171794 | 6/2000 |
| JP | 2002-098955 | 4/2002 |
| JP | 2003-302740 | 10/2003 |
| JP | 2003-302741 | 10/2003 |
| JP | 2003-302742 | 10/2003 |
| KR | 1999-14250 | 2/1999 |
| KR | 2002-10747 | 2/2002 |

OTHER PUBLICATIONS

Communication from Korean Patent Office regarding counterpart application, no translation.

* cited by examiner

*Primary Examiner*—Andrew Schechter
(74) *Attorney, Agent, or Firm*—Harness, Dickey & Pierce, P.L.C.

(57) ABSTRACT

A substrate for an electro-optical device according to the present invention comprises a base layer and a reflective film deposited on the substrate, a plurality of pixel regions including a portion of the base layer and the reflective film, wherein a transmissive opening where the reflective film is not formed and a base opening where the base layer is not formed are provided in each pixel region, and wherein the base opening is arranged in a position overlapped with the transmissive opening in plan view and extends continuously between the adjacent pixel regions.

10 Claims, 18 Drawing Sheets

F I G. 8
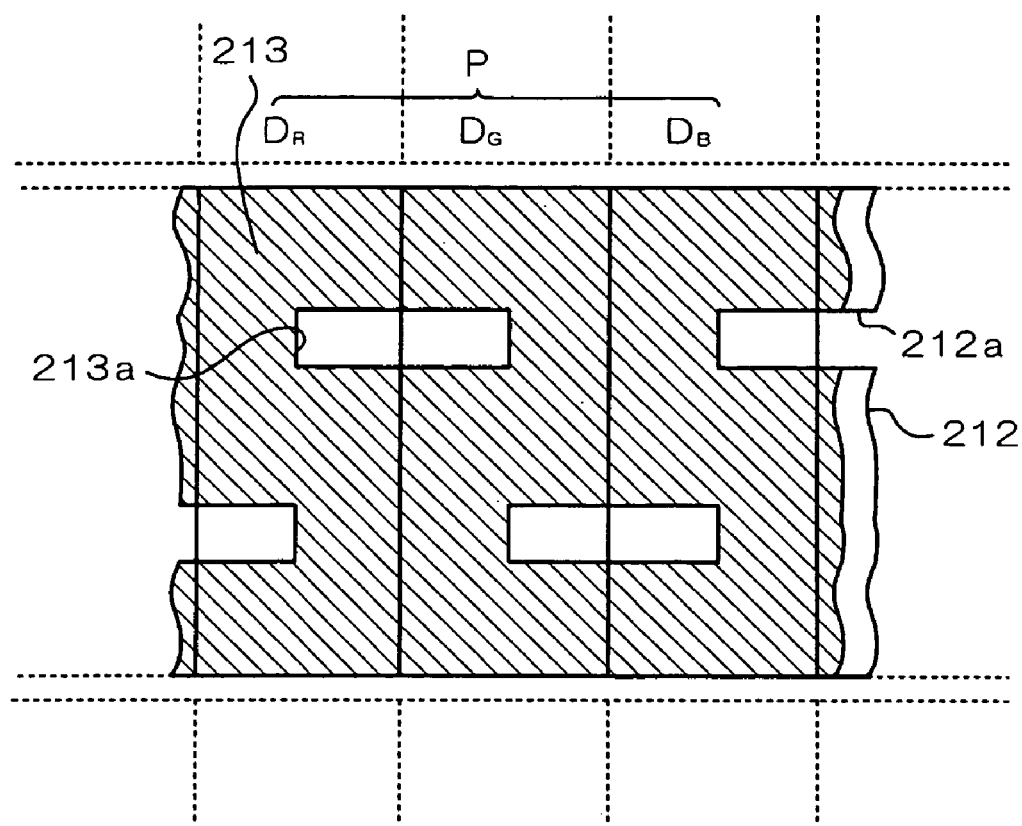

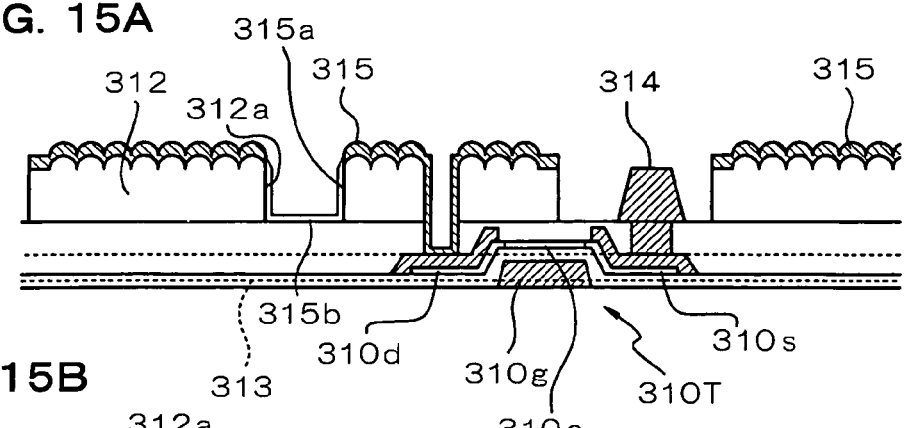
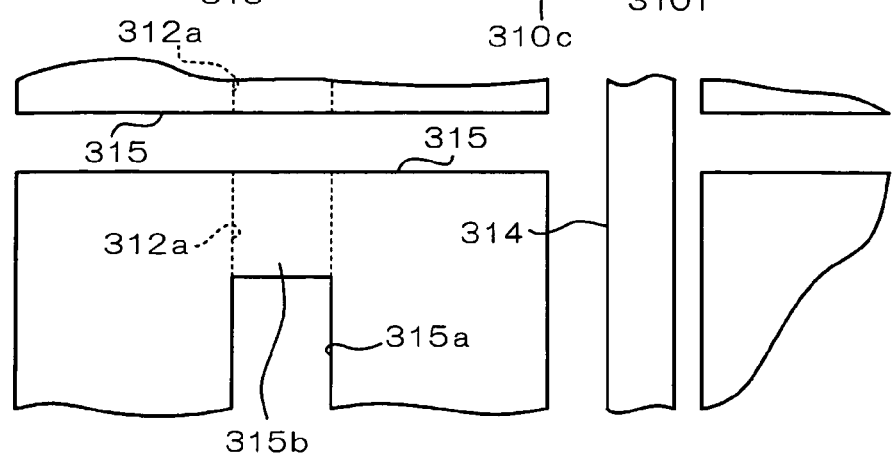

SUBSTRATE FOR REFLECTIVE-TRANSMISSIVE ELECTRO-OPTICAL DEVICE HAVING OPENING IN BASE LAYER VARYING IN SIZE ALONG A FIRST DIRECTION

RELATED APPLICATIONS

This application claims priority to Japanese Patent Application No. 2003-300037 filed Aug. 25, 2003 which is hereby expressly incorporated by reference herein in its entirety.

BACKGROUND

1. Field of Invention

The present invention relates to a substrate for an electro-optical device and manufacturing method thereof, an electro-optical device and manufacturing method thereof, and an electronic apparatus. More particularly, the present invention relates to a reflective film structure suitable for a transflective electro-optical device and a method for manufacturing the same.

2. Description of Related Art

A transflective electro-optical device is widely used in portable electronic apparatuses. A transflective liquid crystal display device is currently being used in mobile phones and portable information terminals. Similar to a transmissive liquid crystal display device, the transflective liquid crystal display device can also implement transmissive display by turning on/off a back light. Further, even when the back light is not used, the transflective liquid crystal display device can implement reflective display similarly to a reflective liquid crystal display device by reflecting external light with a reflective film. Thus, the transflective liquid crystal display device has advantages in that it is possible to selectively use the transmissive display or the reflective display and to reduce power consumption by using the reflective display.

Though the transflective liquid crystal display device is constructed to reflect external light with a reflective film and use the reflected light for display, if the reflecting surface of the reflective film is in the state of, for example, a mirror surface, an illusion occurs due to illumination or projection of a background image, such that visibility may be decreased. Therefore, in order to obtain a suitable brightness in the display as well as to prevent illusions due to illumination or projection of the background image, a light scattering reflective surface having a minute unevenness is typically used. A known method involves forming a base layer made of a resin having unevenness on a substrate and forming a reflective film on the base layer, thereby forming the light scattering reflective surface corresponding to the unevenness of the base layer.

In the above transflective liquid crystal display device, as shown in FIGS. 18 and 19, a base opening 112a is provided in each pixel on a base layer 112 having unevenness by coating a photosensitive resin on one of the substrates of a liquid crystal panel, and by performing exposure and developing processes. A reflective film 113 made of a metallic thin film is provided on the base layer 112. A transmissive opening 113a where the reflective film is not formed is provided on a region overlapped with the base opening 112a in plan view. According to this configuration, the light irradiated from a back light (not shown) passing through the transmissive opening 113a and the base opening 112a in each pixel region becomes light for transmissive display. On the other hand, external light incident to the liquid crystal panel and reflected in reflective films 113R, 113G, and 113B in each pixel region becomes light for reflective display.

However, in the conventional transflective liquid crystal display device, there is a problem in that, since the base opening 112a is formed in a window shape with the base layer 112 removed from each pixel region, a bridge shape of a resin portion between adjacent base openings 112a may be delaminated from the substrate when the base layer 112 is developed. Particularly, if the aperture ratio of the transmissive opening 113a increases in each pixel in order to maximize the transmissive display, the width of the bridge part of the resin portion becomes narrower. Therefore, the base layer 112 is easily delaminated. In addition, as shown in FIGS. 18 and 19, when each pixel region has a lengthwise rectangular shape, if the transmissive opening 113a is formed to have a large size, the width of the resin portion between the adjacent base openings 112a arranged in a direction perpendicular to the longitudinal side of the pixel region becomes smaller as shown in the resin portion 113X in FIG. 18. Therefore, the resin portion is more easily delaminated from the substrate.

Once the resin portion is delaminated from the substrate during the process of developing the base layer 112, even if the delaminated resin portion can be re-attached, a defective shape occurs in the base layer 112, such that the shape of the reflective film also causes a defective image. Accordingly, there is a problem in that the product yield is commonly decreased.

SUMMARY

Accordingly, in order to solve the above problems, it is an object of the present invention to provide a base layer having a characteristic of being rarely delaminated by changing a pattern of the base layer, so that defects in a reflective film can be prevented to improve a product yield.

According to an aspect of the present invention, there is provided a substrate for an electro-optical substrate comprising a base layer provided on the substrate, a reflective film deposited on the base layer, a plurality of pixel regions provided in a region including the base layer and the reflective film, a transmissive opening provided in each pixel region, and a base opening arranged in a position overlapped with the transmissive opening in plan view, wherein the reflective film is not provided on the transmissive opening, the base layer is not provided on the base opening, and the base opening extends continuously between the adjacent pixel regions.

According to the present invention, since the base opening extends continuously between the adjacent pixel regions, there is no bridge shape of the base layer arranged on the base opening between the adjacent pixel regions. Therefore, it is possible to prevent defective products because the base layer is rarely delaminated.

In this case, the base opening extending continuously between the adjacent pixel regions includes a case that one base opening is provided continuously across each of at least two adjacent pixel regions. Also, a case that one base opening is provided in a single body across three pixel regions can be included, but the present invention is not limited thereto.

Preferably, according to the present invention, the base opening has a slit shape extending along a predetermined arrangement direction of the pixel region. By doing this, since the base opening has a slit shape extending along a predetermined direction, the edge portion of the base opening can be simple and easy to manufacture. Therefore, the base layer is rarely delaminated from the edge portion of the corresponding opening.

In this case, the edge portion of the base opening is preferably arranged straight (linearly) in the predetermined arrangement direction because the base layer is rarely delaminated. In addition, in the substrate for an electro-optical device, the slit shape of transmissive opening and the base opening are preferably extends continuously across all the pixel regions arranged in the predetermined arrangement direction because the pattern of the base layer can be simple and easy to manufacture.

Preferably, according to the present invention, each pixel region has a rectangular shape, its longitudinal side is arranged straight in a predetermined direction, and the predetermined arrangement direction of the slit shape of the base opening is perpendicular to the longitudinal side of the pixel region. By doing this, since the base opening has slit shape extending in a direction different from the longitudinal side of the pixel region, it is possible to obtain a wider space from another base opening in the adjacent pixel region. Therefore, it is possible to further prevent the exfoliation of the base layer.

In this case, the predetermined arrangement direction is preferably perpendicular to the longitudinal side of the pixel region. By doing this, since the position of the base opening passing through the pixel regions is basically identical between the pixel regions, it is possible to reduce display quality degradation caused by the lack of position uniformity of the transmissive opening overlapped with the base opening in plan view.

Preferably, according to the present invention, the base layer has an uneven surface, and the reflective surface has a light scattering reflective surface influenced by the uneven surface. By doing this, it is possible to easily form the light scattering reflective surface on the reflective film, and also implement reflective display with high visibility, due to the light scattering reflective surface.

Preferably, according to the present invention, the uneven surface is not provided on the edge portions of the base opening in the base layer. By doing this, since the uneven surface is not provided on the edge portions of the base opening in the base layer, it is possible to improve adherence or strength in the edge portions of the base layer. Therefore, the base layer is rarely delaminated.

In addition, since the reflective film can also be provided on the side surface of the edge portions of base opening in the base layer, the side surface of the base layer is covered with the reflective film. Therefore, it is possible to reduce the exfoliation of the base layer and the reflective film after forming the reflective film.

According to another aspect of the present invention, there is provided a method of manufacturing a substrate for an electro-optical device in which a base layer and a reflective film are deposited on the substrate and a plurality of pixel regions including a portion of the base layer and the reflective film are arranged. The method comprises the steps of forming the base layer such that a base opening where the base layer is not formed is provided in each pixel region, and the base opening extends continuously between the adjacent pixel regions; and forming the reflective film such that a transmissive opening where the reflective film is not formed is overlapped with the base opening in plan view.

According to the present invention, preferably, in the step of forming the base layer, a photosensitive resin is exposed by using a predetermined mask and then developed to form the base layer having the uneven surface. By doing this, it is possible to easily form the uneven surface and to simultaneously form the base opening according to exposure intensity or an exposure pattern.

In this case, preferably, the reflective film is also provided on the side surface of the edge portion of the base opening in the base layer. By doing this, since the side surface of the base layer is covered with the reflective surface, it is possible to reduce exfoliation of the base layer or the reflective film after forming the reflective film.

According to another aspect of the present invention, there is provided an electro-optical device comprising: an electro-optical layer; a reflective film arranged opposite to the electro-optical layer; a base layer arranged on a side opposite to the electro-optical layer of the reflective film; a plurality of pixel regions provided in a region including the electro-optical layer and the reflective film; a transmissive opening provided on each pixel region, in which the reflective film is not provided on the transmissive opening; and a base opening overlapped with the transmissive opening in plan view, in which the base opening is not provided with the base layer between the adjacent pixel regions.

According to the present invention, since the base opening extends continuously between the adjacent pixel regions, there is no bridging part of base layer between the base openings on the adjacent pixel regions. Therefore, the base layer is rarely delaminated, and it is possible to prevent defective products. Accordingly, it is possible to improve the product yield of the electro-optical device and manufacture the electro-optical device at a low cost and high reliability.

Preferably, according to the present invention, the base opening has a slit shape extending along a predetermined arrangement direction of the pixel region.

Preferably, according to the present invention, the pixel region has a rectangular shape, the pixel regions are arranged straight such that its longitudinal side extends in a predetermined direction, and the predetermined arrangement direction is perpendicular to the longitudinal side of the pixel region.

Preferably, according to the present invention, the base layer has an uneven surface, and the reflective film has a light scattering reflective surface influenced by the uneven surface.

Preferably, according to the present invention, the uneven surface is not provided on edge portions of the base opening in the base layer.

According to still another aspect of the present invention, there is provided a method of manufacturing an electro-optical device which comprises an electro-optical layer, a reflective film arranged opposite to the electro-optical layer, a base layer adjacently arranged on a side opposite to the electro-optical layer of the reflective film, and a plurality of pixel regions provided in a region including the electro-optical layer and the reflective film. The method comprises the steps of: forming the base layer having an uneven surface such that the base layer is arranged in each pixel region and has a base opening extending across each adjacent pixel region; and forming the reflective film having a light scattering surface influenced by the uneven surface on a surface of the base layer such that a transmissive opening is provided on the reflective film in a position overlapped with the base opening in plan view.

Preferably, according to the present invention, in the step of forming the base layer, a photosensitive resin is exposed by using a predetermined mask and then developed, so that the base layer has an uneven surface.

According to still another aspect of the present invention, there is provided an electronic apparatus comprising one of the electro-optical devices described above and a control means for controlling the electro-optical device. Particularly, the electronic apparatus includes mobile phones, portable information terminals, portable electronic apparatuses such as an electronic watch, a television set, a monitor, a computer, and a consumer electronic apparatus such as a table clock.

BRIEF DESCRIPTION OF THE DRAWINGS

FIG. 8 is an enlarged plan view showing a pattern in a pixel according to a sixth embodiment of the present invention.

FIGS. 15(a) and 15(b) are a partially enlarged sectional view and a partially enlarged plan view showing a liquid crystal display device according to an eighth embodiment of the present invention.

DETAILED DESCRIPTION

Preferred embodiments of the present invention will now be described in detail with reference to the drawings. Such description is for illustrative purpose only, and it is to be understood that changes and variations may be made without departing from the spirit or scope of the invention.

FIRST EMBODIMENT

Figure 1:
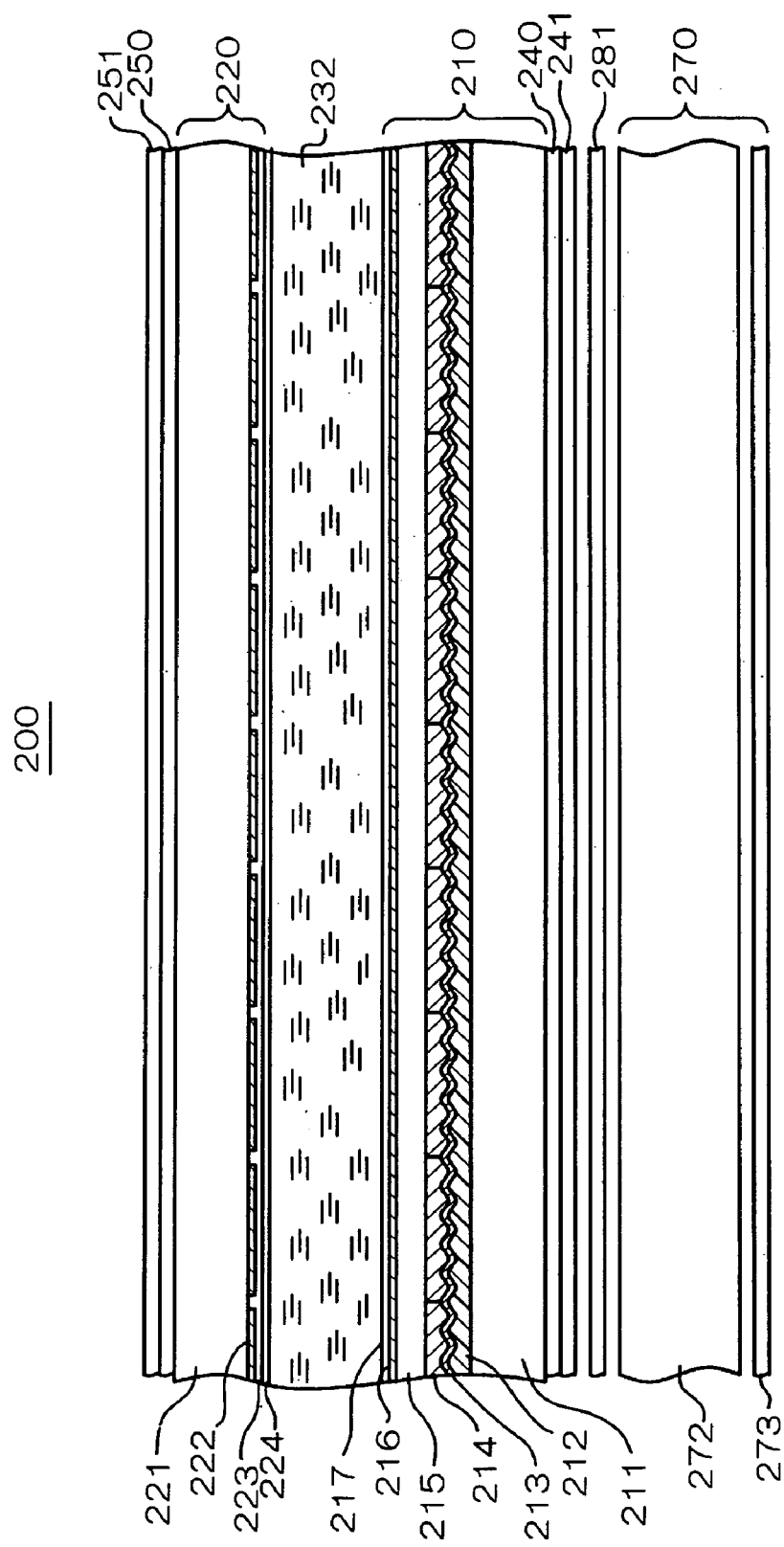
FIG. 1 is an enlarged longitudinal sectional view showing a construction of a liquid crystal display device according to a first embodiment of the present invention.
Figure 12:
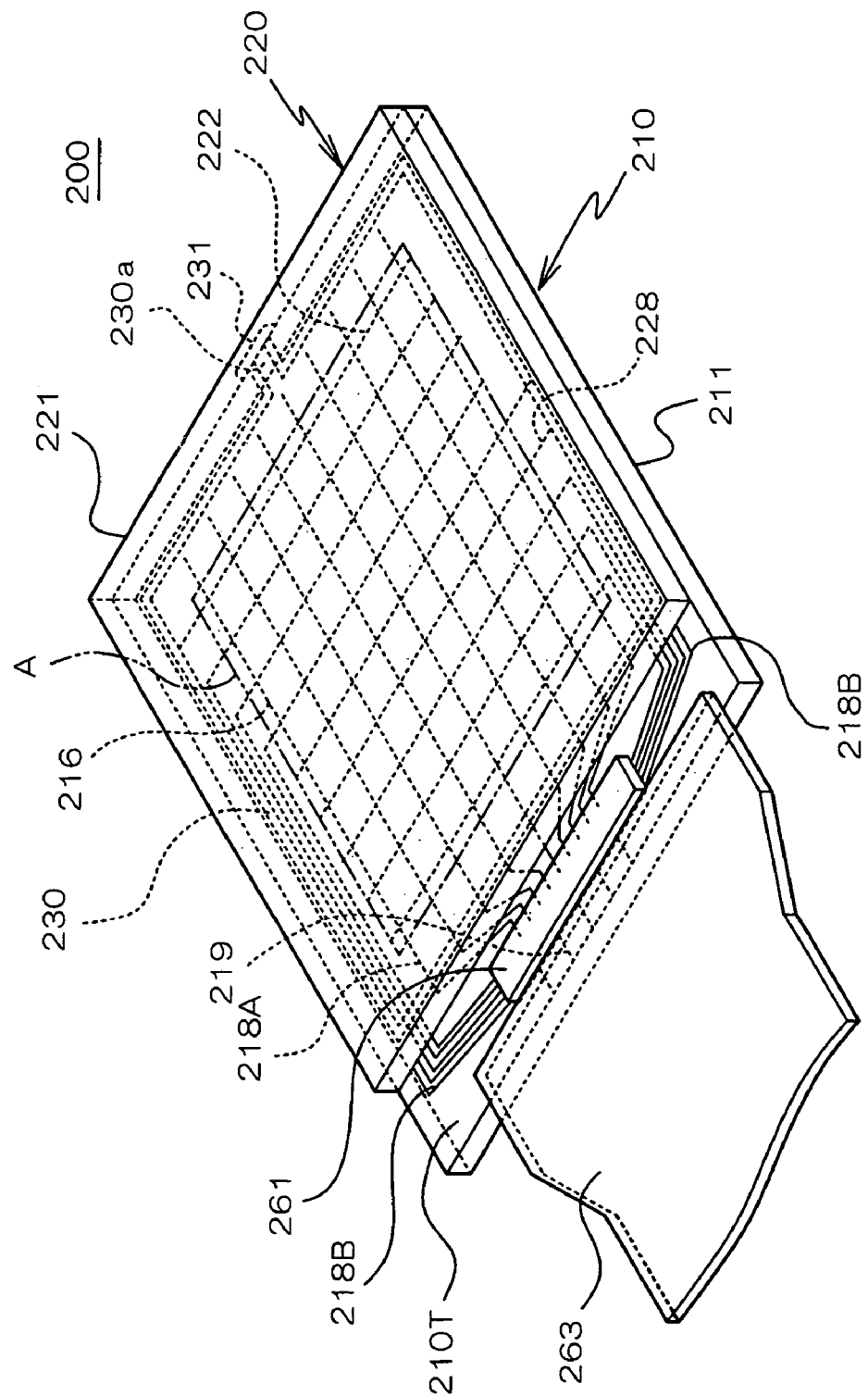
FIG. 12 is a schematic perspective view showing a liquid crystal panel of a liquid crystal display device according to a first embodiment of the present invention.
Figure 13:
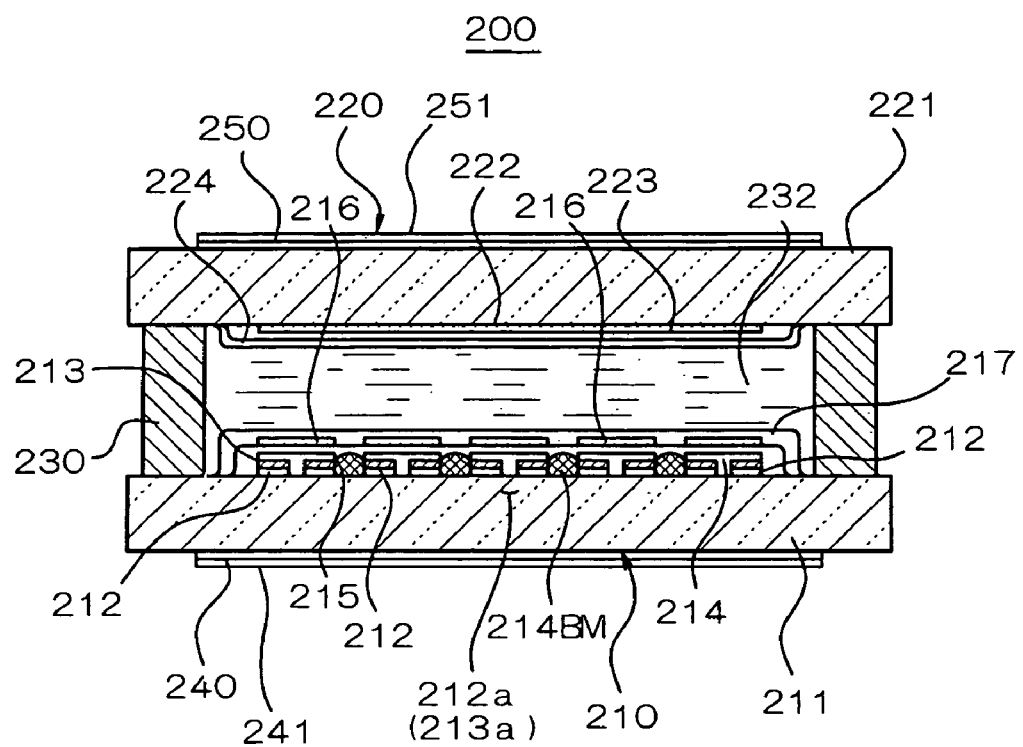
FIG. 13 is a schematic longitudinal sectional view showing a liquid crystal panel according to a first embodiment of the present invention.

FIG. 12 is a schematic perspective view showing a panel construction of a liquid crystal display device 200 according to a first embodiment of an electro-optical device of the present invention, FIG. 13 is a schematic longitudinal sectional view showing the panel construction, and FIG. 1 is an partially enlarged longitudinal sectional view showing in detail a cross section orthogonal to the liquid crystal display device 200 in FIG. 13.

As shown in FIG. 12, the liquid crystal display device 200 comprises a substrate 210 for an electro-optical device including a first transparent substrate 211 made of, for example, a glass plate or a synthetic resin plate as a base body, and an opposite substrate 220 including a second substrate 221 as a base body. The substrate 210 and the opposite substrate 220 are bonded with a sealing material 230, and the liquid crystal material 232 is filled into an inner space surrounded with the sealing material 230 through an injection hole 230a. Then, the injection hole is blocked by a blocking material 231, thus forming a cell construction.

In the substrate 210 for an electro-optical device, a plurality of transparent electrodes 216 having a stripe shape are formed in parallel on the inner surface (opposite to the second substrate 221) of the first substrate 211 by a sputtering method. Similarly, in the opposite substrate 220, a plurality of transparent electrodes 222 having a stripe shape are formed in parallel on the inner surface of the second substrate 221. In addition, the transparent electrodes 216 are electrically connected to a wiring 218A, and the transparent electrodes 222 are electrically connected to a wiring 228. The transparent electrodes 216 and the transparent electrodes 222 are perpendicular to each other, and their intersections constitute a plurality of pixels arranged in a matrix. Such a pixel array constitutes a liquid crystal display region A.

The first substrate 211 has an extended substrate section 210T which extends over the second substrate 221. On the extended substrate section 210T, the wiring 218A, a wiring 218B electrically connected to the wiring 228 through a vertical conducting section formed on a portion of the sealing material 230, and an input terminal 219 made of a plurality of independent wiring patterns are provided. In addition, on the extended substrate section 210T, a semiconductor IC261 having a liquid crystal driving circuit is mounted to be electrically connected to the wirings 218A and 218B and to the input terminal 219. In addition, on the end of the extended substrate section 210T, a flexible wiring board 263 is mounted to be electrically connected to the input terminal 219.

In the liquid crystal display device 200, as shown in FIGS. 1 and 13, a phase difference plate (a quarter wavelength film) 240 and a polarization film 241 are disposed on an outer surface of the first substrate 211, and a phase difference plate (a quarter wavelength film) 250 and a polarization film 251 are disposed in an outer surface of the second substrate 221.

As shown in FIGS. 1 and 13, in the substrate 210 for an electro-optical device, a transparent base layer 212 is provided on the surface of the first substrate 211. On the pixel region, a base opening 212a where the base layer 212 is not formed is provided. In addition, a reflective film 213 is provided on the base layer 212. Here, a transmissive opening 213a where the reflective film 213 is not formed is provided in each pixel region. The transmissive opening 213a is arranged in a position overlapped with the base opening 212a in plan view.

A colored layer 214 is provided on the reflective film 213, and further a surface protection layer 215 (an overcoat layer) made of a transparent resin is provided thereon. The colored layer 214 and the surface protection layer 215 constitute a color filter. The surface protection layer 215 is provided in order to planarize the surface of the color filter and to prevent the liquid crystal material from the degradation caused by penetration of an organic material from the colored layer 214.

Typically, the colored layer 214 is allowed to implement a color tone by diffusing a coloring material such as pigment or dye into the transparent resin. The color tone of the colored layer 214 includes combination of a red color (R), a green color (G), and a blue color (B) as a primary color system filter, but not limited thereto, and various kinds of color tones such as a complementary color system. Typically, the colored layer having a predetermined color pattern can be formed, by coating a color-resist material made of a photosensitive resin including a coloring material such as pigment or dye on a substrate and removing unnecessary portions by using a photolithography method.

Here, in the case of colored layers having a plurality of color tones, the above process is repeated.

In addition, according to the present embodiment, although a stripe pattern is used as an array pattern of the colored layers, various kinds of arrays such as a delta array or a slanted mosaic array can be applied. Further, as a portion of the colored layer, a light shielding film 214 BM (a black matrix or a black mask) may be formed around each of the RGB colored layers in order to shield light into the inter-pixel region.

On the surface protection layer 215, transparent electrodes 216 made of a transparent conductive material such as an indium tin oxide (ITO), are provided by sputtering. The transparent electrodes 216 are formed in a band shape extending in a direction perpendicular to the paper surface of FIG. 13 (or parallel to the paper surface of FIG. 1), and a plurality of transparent electrodes 216 are arranged in parallel to form a stripe shape. On the transparent electrodes 216, an alignment film 217 made of a polyimide resin is provided.

On the other hand, in the liquid crystal display device 200, an opposite substrate 220 disposed oppositely to the substrate 210 for an electro-optical device has a transparent electrode 222 similar to the transparent electrode 216 on the second substrate 221 made of, for example, glass. On the transparent electrode 222, a hard protective film 223 made of, for example, $SiO_2$ or $TiO_2$ is provided. Furthermore, an alignment film 224 similar to the alignment film 217 is laminated above the hard protective film 224.

As shown in FIG. 1, a back light 270 is used in the liquid crystal display device 200. The back light 270 comprises a light source (not shown) such as a light emitting diode, an light-guiding plate 272 for introducing the light from the light source, propagating the light through the inside thereof, and outputting the light from one side of the surfaces, and a reflective sheet 273 disposed behind the light-guiding plate 272. In addition, a diffusion plate 281 is disposed between the back light 270 and the panel construction.

According to the present embodiment, the color filter is formed inside of the substrate 210 for an electro-optical device. However, the color filter can be provided in the opposite substrate 220. In addition, each colored layer 214 constituting the color filter may be provided such that a region on the transmissive opening 213a and a region on the reflective film 213 are separately provided in each pixel region, or the colored layer 214 may not be provided on a portion of the reflective film 213.

Figure 2:
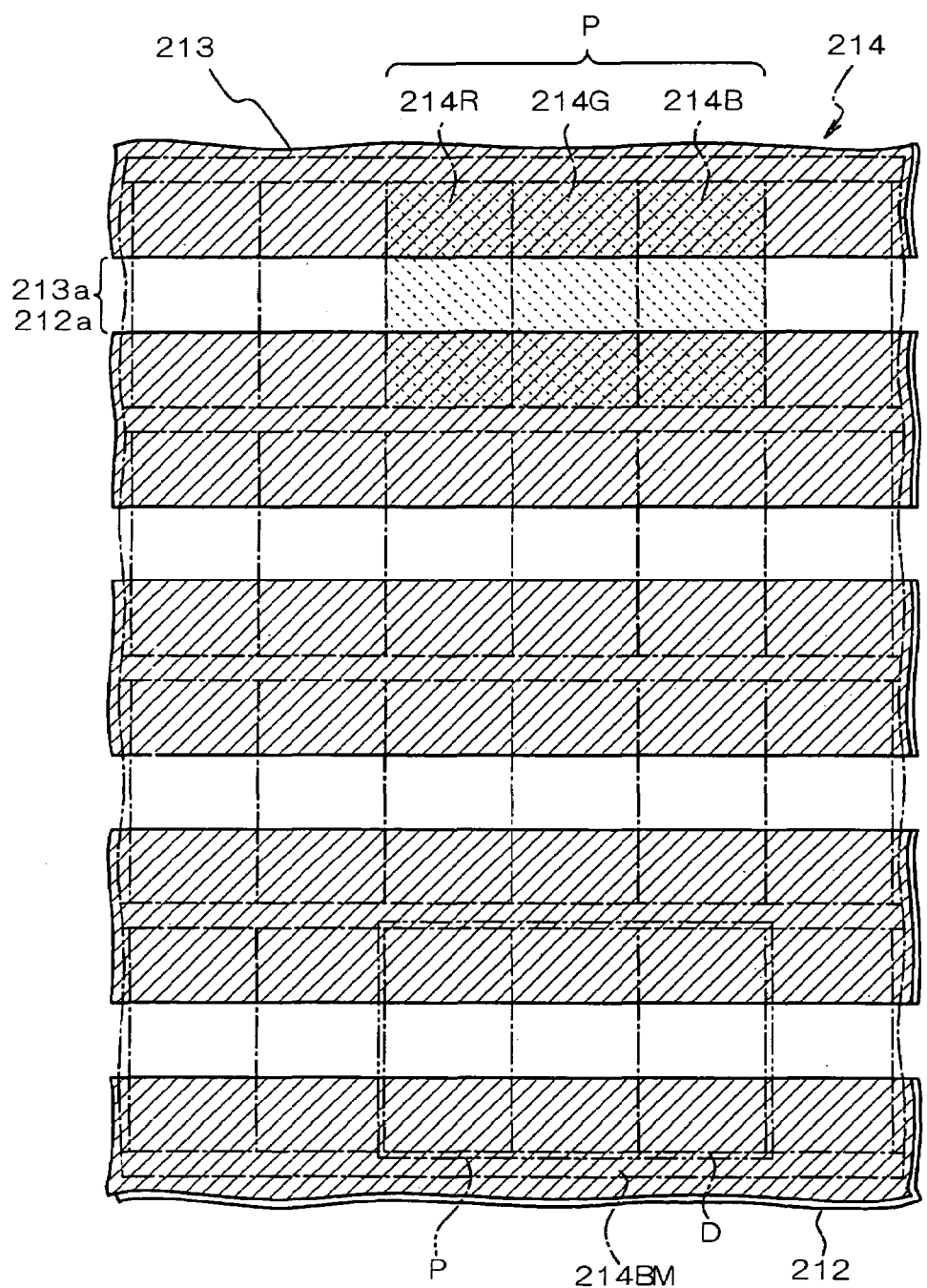
FIG. 2 is an enlarged plan view showing a pattern of a reflective film of a substrate for an electro-optical device according to a first embodiment of the present invention.

FIG. 2 is a plan view showing a reflective film 213 of the substrate 210 for an electro-optical device. Herein, the colored layer 214 is shown as one dotted solid line, and the base layer 212 is shown as a partially-protruded portion from the reflective layer 213. According to the present embodiment, the base layer 212 and the reflective film 213 are deposited on the same position overlapped with each other in plan view. In addition, one pixel region D is obtained by combining the colored layers 214R, 214G, and 214B of the color filter. In the illustrated example, pixel regions D comprised of three colored layers 214R, 214G, and 214B are adjacently positioned to form one pixel P.

In the pixel region D, the base opening 212a and the transmissive opening 213a are constructed to traverse the pixel region D, and to extend continuously between adjacent pixel regions D. More specifically, the base opening 212a and the transmissive opening 213a are formed to have a slit shape extending across a plurality of pixel regions D arranged in a short side direction (a horizontal direction viewing the paper) of the pixel region D. In addition, edge portions of the openings of the base layer 212 and the reflective film 213 are arranged in a straight line shape (linearly). Therefore, the base opening 212a and the transmissive opening 213 are formed to have a long band shape of the same width.

Figure 3:
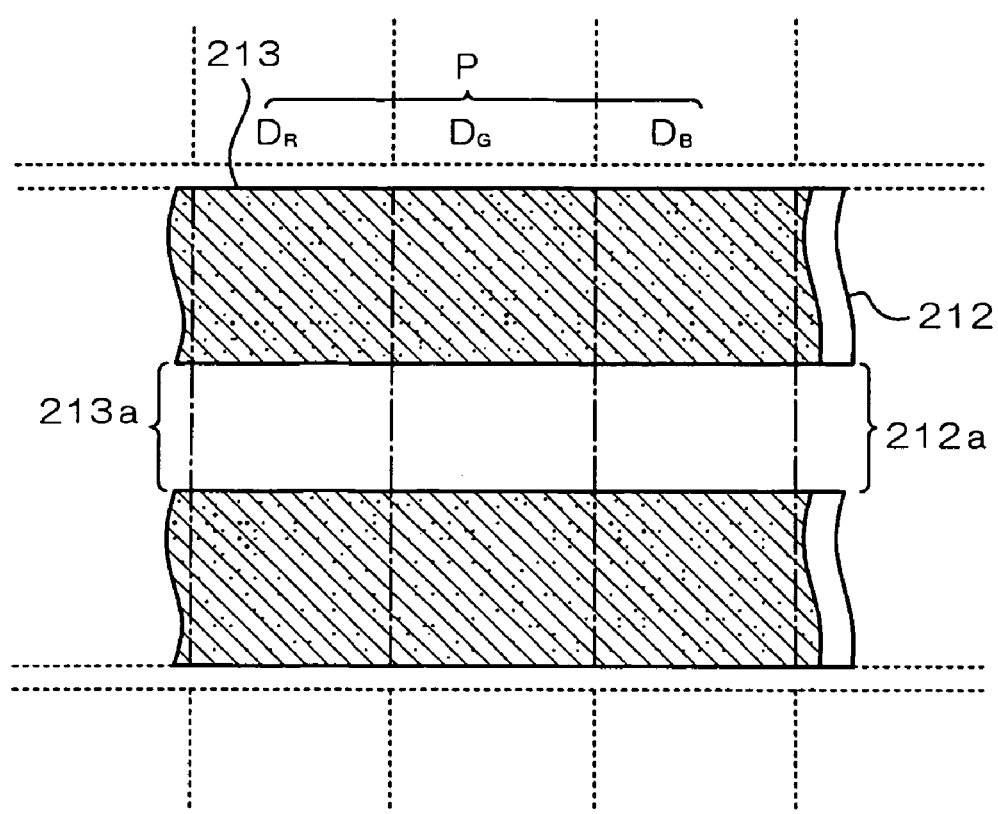
FIG. 3 is an enlarged plan view showing a pattern in a pixel according to a first embodiment of the present invention.

FIG. 3 is a partially enlarged plan view showing one pixel structure according to an embodiment of the present invention. Since the base opening 212a is formed to extend across a plurality of pixel regions, no bridge shaped portions inserted into the openings are formed between the pixel regions D (that is, pixel regions $D_R$ and $D_G$, $D_G$ and $D_B$, and $D_B$ and $D_R$) unlike the prior art. According to the present invention, the transmissive opening 213a may or may not extend across adjacent pixel regions D. However, according to the present embodiment, the transmissive opening 213a and the base opening 212a are arranged in a position overlapped with each other in plan view.

Manufacturing Method

Now, a method of manufacturing a substrate 210 for an electro-optical device of a liquid crystal display device will be described with reference to FIGS. 10 and 11.

Figure 10A:
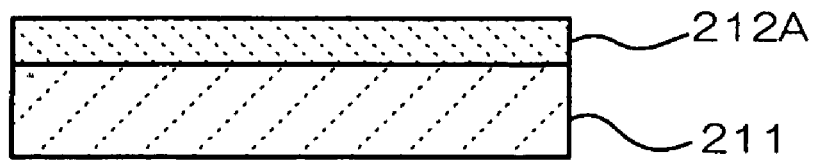
FIGS. 10(a) to 10(d) are process sectional views showing a method of manufacturing a substrate for an electro-optical device.

First, as shown in FIG. 10(a), a photosensitive resin 212A is coated on the surface of the substrate 211 made of glass or plastic by using a spin coating method or a roll coating method. In this embodiment, the photosensitive resin 212A is preferably a light-soluble positive photosensitive resin such as an acrylic resin. However, a light-curable negative photosensitive resin may be used.

Figure 10B:
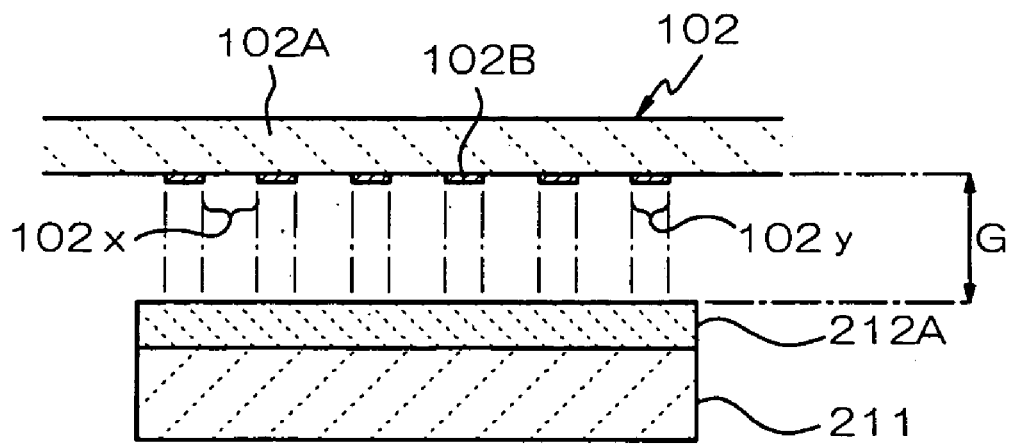

Next, as shown in FIG. 10(b), the photosensitive resin 212A is exposed by using a mask 102. Herein, the mask 102 is provided by forming a light shielding layer 102B composed of a thin film made of, for example, Cr, on the surface of a transparent substrate 102A such as glass. In the mask 102, the regions not covered by the light shielding layer 102B serve as a light transmitting section 102x, and the regions covered by the light shielding layer 102B serve as a light shielding section 102y. The light through the light transmitting section 102x is irradiated onto the photosensitive resin 212A. In this case, a proximity exposure is accomplished in order to establish a exposure gap G of 30~250 μm between the mask 102 and the photosensitive resin 212A, so that the light passing through the mask pattern 102 can be appropriately diffracted to increase or decrease an exposure light intensity onto the photosensitive resin 212A in a smooth manner in plan view. Furthermore, this exposure process may be accomplished in a stepper exposure using a stepper exposure apparatus.

Figure 10C:
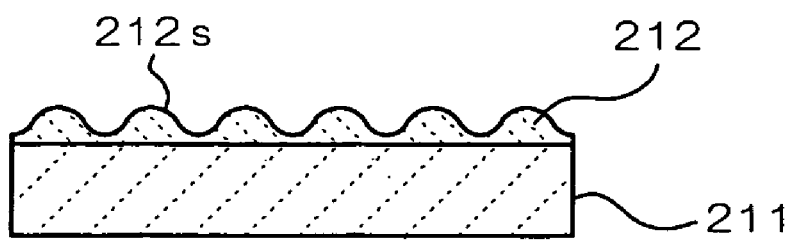
Figure 10D:
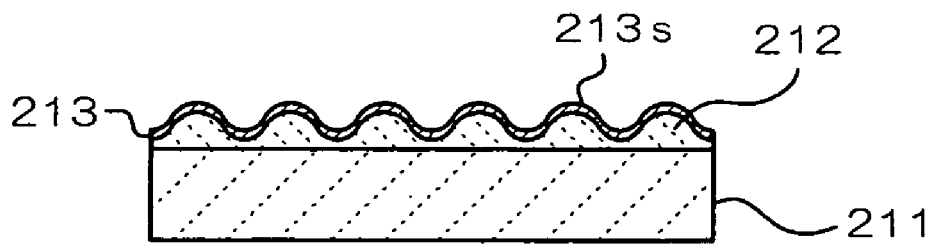

Then, the photosensitive resin 212A is developed by using a predetermined developing solution. As shown in FIG. 10(c), height differences occur between the regions corresponding to the light transmitting section 102x in the mask 102 and the regions corresponding to the light shielding section 102y. In the developing process, a positively exposed resin is removed from the surface of the photosensitive resin 212A corresponding to the distribution of the exposure light intensity. Therefore, the base layer can have a relatively smooth uneven surface 212s as shown in the figure.

Then, on the surface of the base layer 212, a thin metallic film made of a metallic material such as aluminum, silver, silver alloy (APC alloy, etc.), and chrome is provided to form a reflective film 213. Since the base layer 212 serving as a base surface has an uneven surface, the reflective film 213 also has a light scattering surface 213s influenced by the uneven surface 212s of the base layer 212.

Figure 11A:
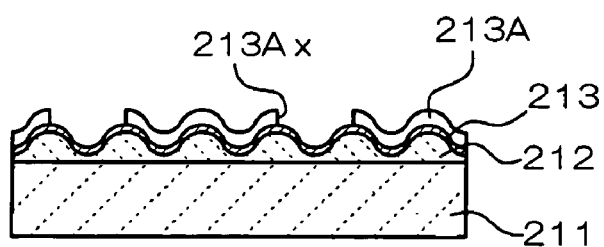
FIGS. 11(a) to 11(e) are process sectional views showing a method of manufacturing a substrate for an electro-optical device.
Figure 11B:
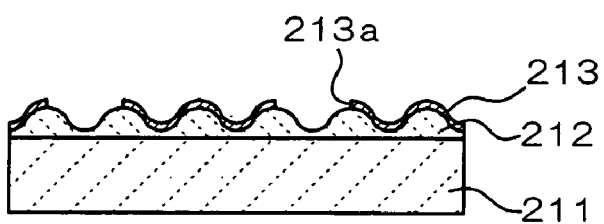
Figure 11C:
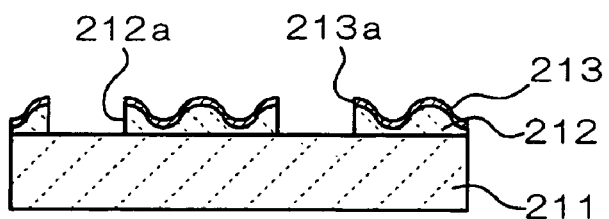

Then, as shown in FIG. 11(a), a mask 213A made of a resist material is provided on the surface of reflective film 213 according to a photolithography method. The mask 213A has openings 213Ax in regions where the reflective film 213 is not necessary. In addition, by performing an etching process using the mask 213A, as shown in FIG. 11(b), a transmitting opening 213a is provided in a reflective film 213. Furthermore, a portion of the base layer 212 is exposed using the mask 213A or the reflective film 213 as a mask, and then removed by a developing process. Accordingly, as shown in FIG. 11(c), a base opening 212a is formed. Since the base opening 212a is provided on the base layer 212, the light passing through transmissive opening 213a of the reflective film 213 does not transmit through the base layer 212, the influence of the transmissive light due to the scattering or refraction caused by the uneven surface 212s of the base layer 212, or the coloring can be prevented. Then, the substrate 210 for an electro-optical device described above can be obtained by forming a color filter or a transparent electrode.

Figure 11D:
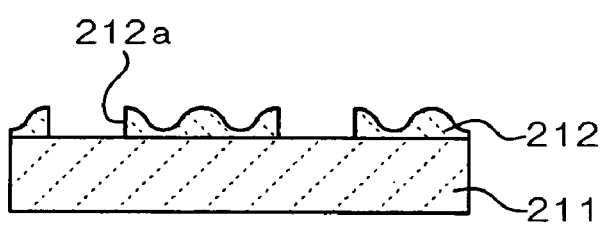
Figure 11E:
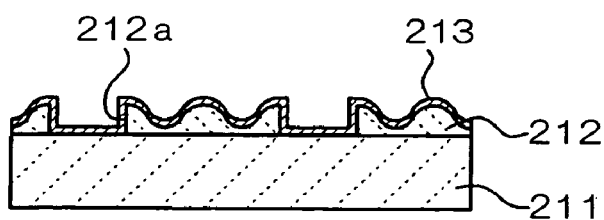

In addition, instead of the above process, as shown in FIG. 11(d), the base opening 212a may be provided on the base layer 212 before forming the reflective film 213. That is, in the exposure process shown in FIG. 10(b), the base opening 212a is formed together with the uneven surface 212s during the developing process by intensively exposing the region corresponding to the base opening 212a. Then, the reflective film 213 is formed as shown in FIG. 11(e), and the transmissive opening 213a is formed by etching, so that the substrate 210 for an electro-optical device similar to the substrate described above can be obtained.

In this embodiment, it is possible to prevent the conventional problem in that the base layer 212 is delaminated from the first substrate 211 during a developing process for forming the base opening 212a on the base layer 212. This is because the bridge shape of resin portion between the openings is eliminated by extending the base opening 212a across the adjacent pixel regions D as shown in FIG. 3. In other words, as a region dissolved by a developing solution becomes narrower, the developing solution is likely to penetrate between the base layer 212 and the first substrate 211, so that a bonding force between the corresponding portion and the first substrate 211 is easily reduced to cause exfoliation. Once exfoliation occurs, even if the corresponding portion is re-attached into the first substrate 211, a defective shape occurs in an upper layer of the reflective film 213 as well as the base layer 212. As such, in this embodiment, since no bridge shape of a portion having a narrow width is provided in the base layer 212, the base layer 212 is not easily delaminated. Accordingly, a defective product ratio can be decreased, so that an electro-optical device can be obtained at a low cost and with high reliability.

In this embodiment, since the base opening 212a is formed in a slit shape extending continuously in a short side direction perpendicular to the longitudinal direction (a long side direction) of pixel regions D formed in a rectangular shape, the shape of the base opening 212a becomes simple and easy to manufacture, such that it is possible to prevent the exfoliation of the base layer 212. Particularly, since the edge portions of the base openings 212a in the base layer 212 are formed in a straight line, a profile line of the base opening 212a can be shorter. This further decreases the occurrence of exfoliation of the base layer 212.

In addition, the aperture ratio (area ratio of the transmissive opening) of each pixel region D can be appropriately set by controlling the widths (vertical lengths shown in the figure) of the base opening 212a and the transmissive opening 213a.

SECOND EMBODIMENT

Figure 4:
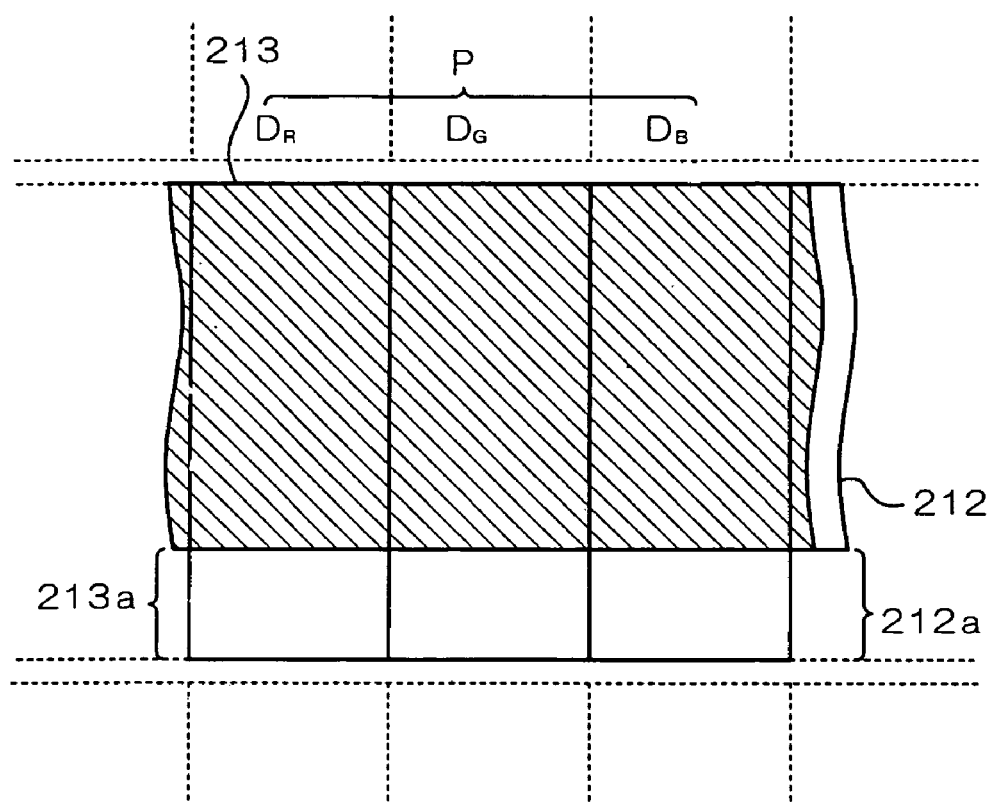
FIG. 4 is an enlarged plan view showing a pattern in a pixel according to a second embodiment of the present invention.

A second embodiment of the present invention will now be described with reference to FIG. 4. Components of this embodiment are similar to those of the first embodiment except for the planar shapes of the base layer 212, the base opening 212a, the reflective film 213 and the transmissive opening 213a, and thus their description will be omitted.

In this embodiment, the base layer 212 and the reflective film 213 are formed separated from one edge (lower edge in the figure) of the pixel region D, and the base opening 212a and the transmissive opening 213a are formed along the edge of the pixel region D. Since this allows the base layer 212 and the reflective film 213 to be provided in one line in the pixel region D, a corresponding pattern can be simple and easy to manufacture.

In addition, this embodiment is similar to the first embodiment in that the base opening 212a extends continuously between pixel regions D, the base opening 212a is formed in a slit shape extending continuously in a short side direction of pixel regions D, and the edge portions of the base openings 212a of the base layer 212 are configured in the shape of straight line.

THIRD EMBODIMENT

Figure 5:
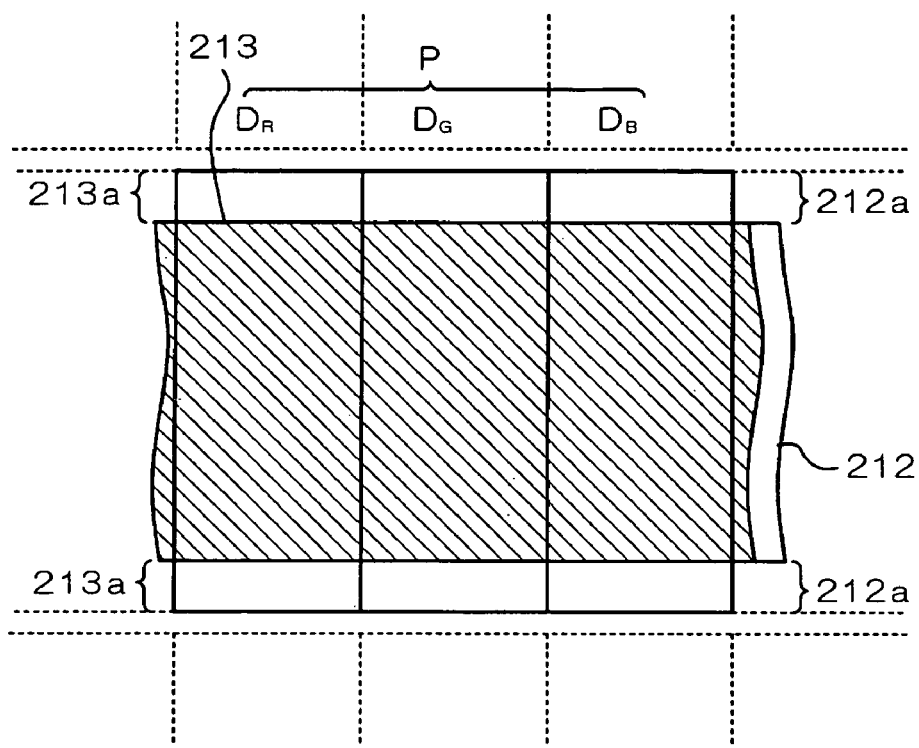
FIG. 5 is an enlarged plan view showing a pattern in a pixel according to a third embodiment of the present invention.

A third embodiment of the present invention will now be described with reference to FIG. 5. Components of this embodiment are similar to those of the first embodiment except for the planar shapes of the base layer 212, the base opening 212a, the reflective film 213, and the transmissive opening 213a, and thus their description will be omitted.

In this embodiment, the base layer 212 and the reflective film 213 are separated from a pair of opposite edges (edges in both upper and lower ends in the figure) of the pixel region D. In addition, a pair of base openings 212a and a pair of transmissive openings 213a are formed along the pair of edges of the pixel region D. By doing this, since the base layer 212 and the reflective film 213 are formed one line to one line of the pixel region D, a corresponding pattern can be simple and easy to manufacture.

In addition, this embodiment is similar to the first embodiment in that the base opening 212a extends continuously between pixel regions D, the base opening 212a is formed in a slit shape extending continuously in a short side direction of pixel regions D, and the edge portions of the base openings 212a of the base layer 212 are configured in the shape of straight line.

FOURTH EMBODIMENT

Figure 6:
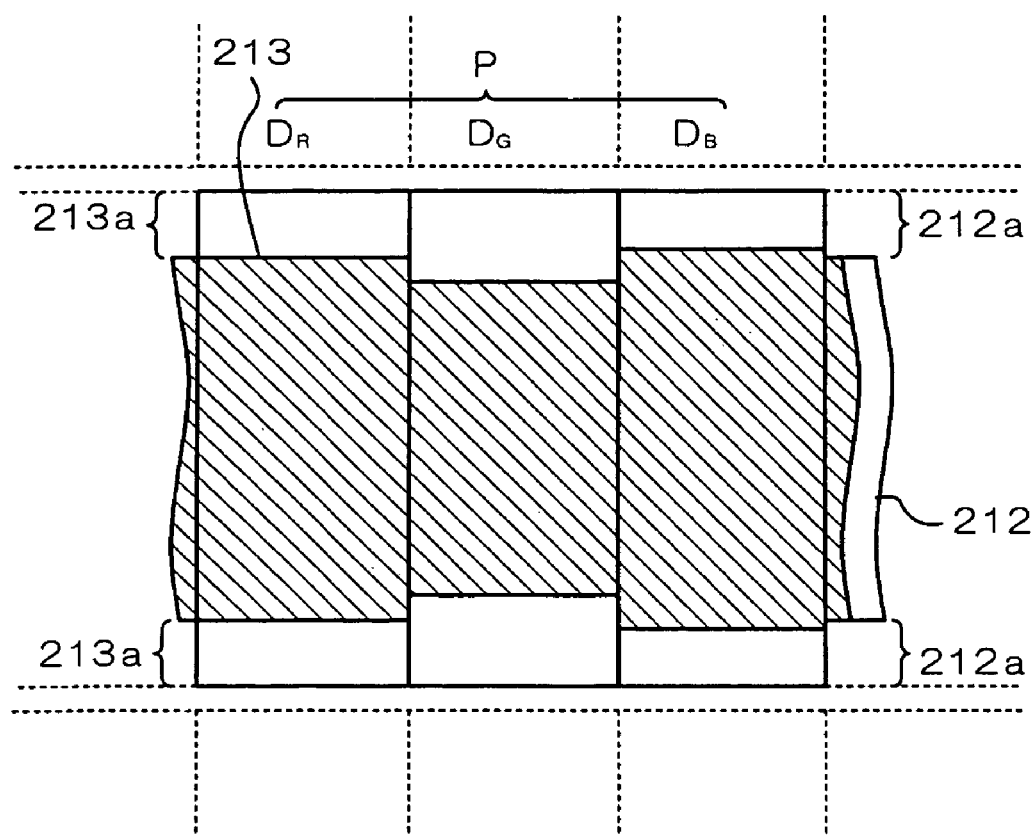
FIG. 6 is an enlarged plan view showing a pattern in a pixel according to a fourth embodiment of the present invention.

A fourth embodiment of the present invention will now be described with reference to FIG. 6. Components of this embodiment are similar to those of the first embodiment except for the planar shapes of the base layer 212, the base opening 212a, the reflective film 213, and the transmissive opening 213a, and thus their description will be omitted.

In this embodiment, similar to the third embodiment, the base layer 212 and the reflective film 213 are separated from a pair of opposite edges (edges of both upper and lower ends in the figure) of the pixel region D. In addition, a pair of base openings 212a and a pair of transmissive openings 213a are formed along the pair of edges of the pixel region D.

However, in this embodiment, the aperture ratio of the transmissive opening 213a is different in the pixel regions $D_R$, $D_G$, and $D_B$, so that edges of the transmissive opening 213a are not lined up (aligned) in a longitudinal direction (a vertical direction in the figure) of the pixel region between the pixel regions D. Therefore, the edges of the base opening 212a are also not lined up to have step difference between the pixel regions. This is because the aperture ratio of the transmissive opening 213a is necessary to be changed between the pixel regions in order to optimize display colors or a balance between the transmissive display and the reflective display, without altering a filter material of the colored layer having a different color when the color filter is formed.

In addition, in this embodiment, since the edges of the base opening 212a are not lined up (aligned) between adjacent pixel regions in order to alter the aperture ratio of the transmissive opening 213a, the edges of the opening can be smoothly connected between the adjacent pixel regions by forming the edges of the opening in a curve shape.

FIFTH EMBODIMENT

Figure 7:
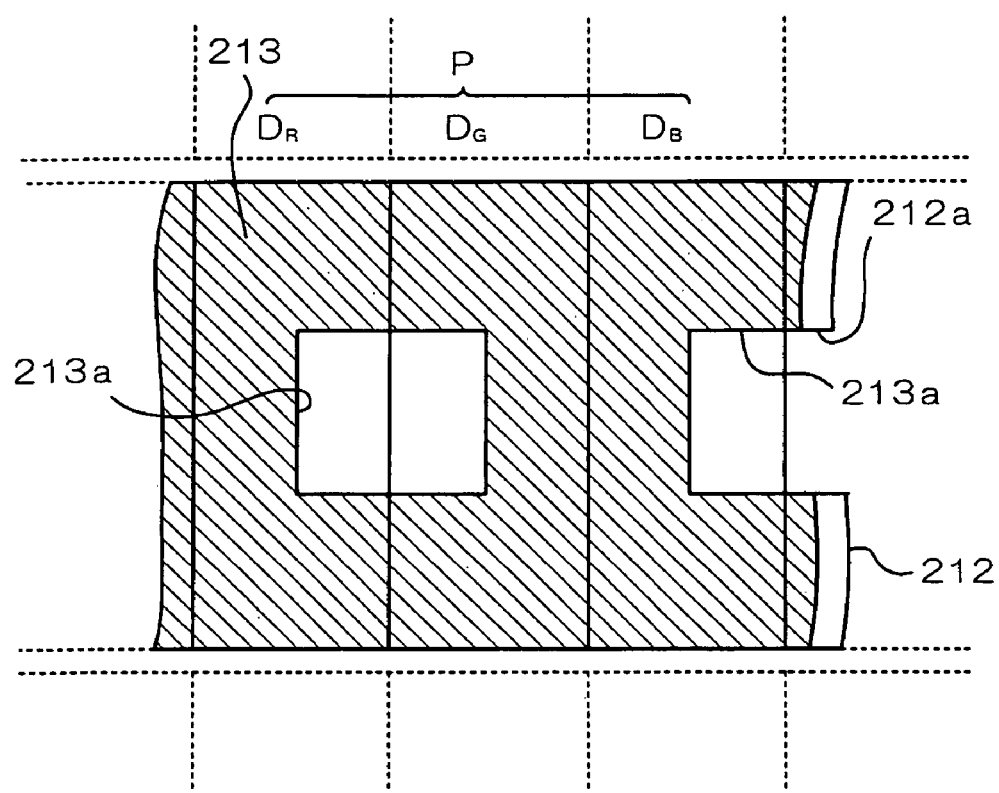
FIG. 7 is an enlarged plan view showing a pattern in a pixel according to a fifth embodiment of the present invention.

A fifth embodiment of the present invention will now be described with reference to FIG. 7. Components of this embodiment are similar to those of the first embodiment except for the planar shapes of the base layer 212, the base opening 212a, the reflective film 213, and the transmissive opening 213a, and thus their description will be omitted.

In this embodiment, the base opening 212a and the transmissive opening 213a extend continuously between adjacent pixel regions $D_R$ and $D_G$, and $D_B$ and $D_R$ in a horizontal direction (a short side direction of the pixel region). In this case, the base opening 212a is formed across only two pixel regions. As such, though the base opening 212a does not extend across three or more pixel regions, since a conventional narrow bridge shape of the base layer portion is not left between the adjacent pixel regions, it is possible to prevent the exfoliation of the base layer 212 similar to the above embodiments. However, in this case, the opening pattern is preferably formed to have a longer width between the adjacent base openings 212a.

SIXTH EMBODIMENT

A sixth embodiment of the present invention will now be described with reference to FIG. 8. Components of this embodiment are similar to those of the first embodiment except for the planar shapes of the base layer 212, the base opening 212a, the reflective film 213, and the transmissive opening 213a, and thus their description will be omitted.

In this embodiment, similar to the fifth embodiment, a first base opening 212a and a first transmissive opening 213a are formed across only two adjacent pixel regions in a horizontal direction (a short side direction of the pixel region). However, in each pixel region, a different base opening 212a and a different transmissive opening 213a are provided. In addition, the different base opening 212a and the different transmissive opening 213a are formed across different pixel regions from the first base opening 212a and the first transmissive opening 213a.

SEVENTH EMBODIMENT

Figure 9A:
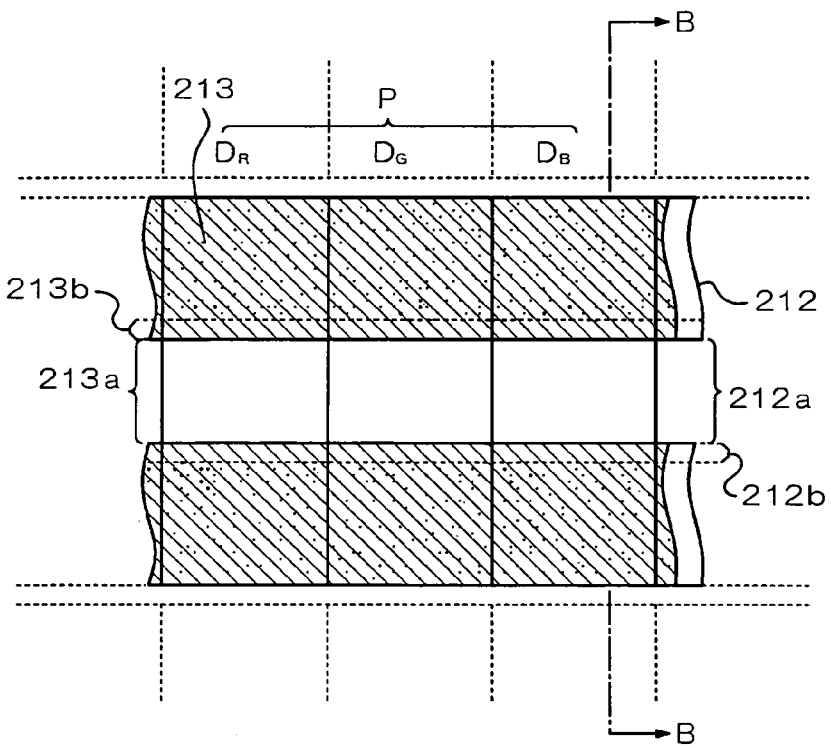
FIGS. 9(a) and 9(b) are an enlarged plan view and an enlarged sectional view showing a pattern in a pixel according to a seventh embodiment of the present invention.
Figure 9B:
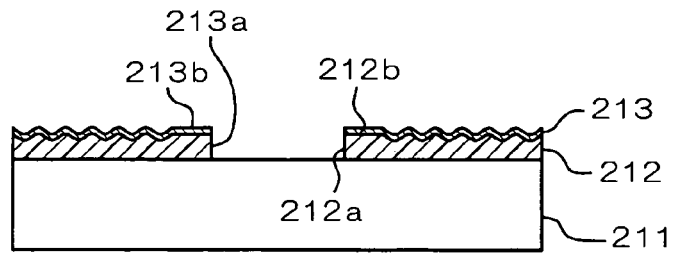

A seventh embodiment of the present invention will now be described with reference to FIG. 9. Components of this embodiment are similar to those of the first embodiment except for the planar shapes of the base layer 212, the base opening 212a, the reflective film 213, and the transmissive opening 213a, and thus their description will be omitted.

In this embodiment, basically, the patterns of the base layer 212, the reflective film 213, the base opening 212a, and the transmissive opening 213a are the same patterns similar to the first embodiment. Unlike the first embodiment, the edge portion 212b of the base opening 212a in the base layer 212 according to the seventh embodiment does not have the uneven surface in comparison to other regions but has a nearly flat surface. Therefore, in the reflective film 213 on the edge portion 212b, a reflective surface of the edge portion 213b of the transmissive opening 213a is not a light scattering surface but nearly a mirror surface.

By doing this, during the process of patterning the base layer 212 (or process of developing according to the above method), the edge portion 212b of the opening is weakly patterned. Therefore, a treatment solution such as a developing solution rarely penetrates between the base layer 212 and the first substrate 211. Accordingly, since it is possible to prevent the lessening of the coherence in the edge portion 212b of the opening or the degradation of strength, the base layer 212 is not easily delaminated.

Figure 9C:
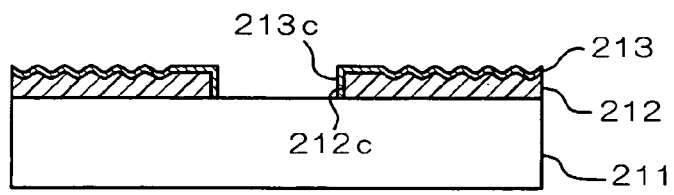
FIG. 9(c) is an enlarged sectional view showing another example thereof.

In addition, as shown in FIG. 9(c), the reflective film 213 may be formed after forming the base opening 212a (for example, by performing the processes shown in FIGS. 11(d) and 11(e)), so that the side 212c facing the base opening 212a in the base layer 212 can be coated with a portion 213c of the reflective film 213. By doing this, since a treatment solution rarely penetrates between the first substrate 211 and the base layer 212 or between the base layer 212 and the reflective film 213, the bonding force of the base layer 212 with respect to the first substrate 211 or of the bonding force of the reflective film 213 with respect to the base layer 212 is hardly reduced. Therefore, it is possible to prevent the exfoliation of the base layer 212 or the reflective film 213 in subsequent processes after forming the reflective film 213.

In addition, the method according to the present embodiment may be also applied to the second through the sixth embodiments described above.

EIGHTH EMBODIMENT

Electro-Optical Device

Now, an electro-optical device having a structure different from those described above will be described with reference to FIGS. 14 and 15. The electro-optical device of the present embodiment is an active-matrix type liquid crystal display device 300 comprising a substrate 310 for an electro-optical device. The liquid crystal display device 300 is formed such that the substrate 310 for an electro-optical device and the opposite substrate 320 are bonded with a sealing material 330, and then a liquid crystal material 332 is filled between two substrates. In this embodiment, unlike the first embodiment, the color filter is provided on the opposite substrate 320 not the substrate 310 for an electro-optical device.

Figure 14:
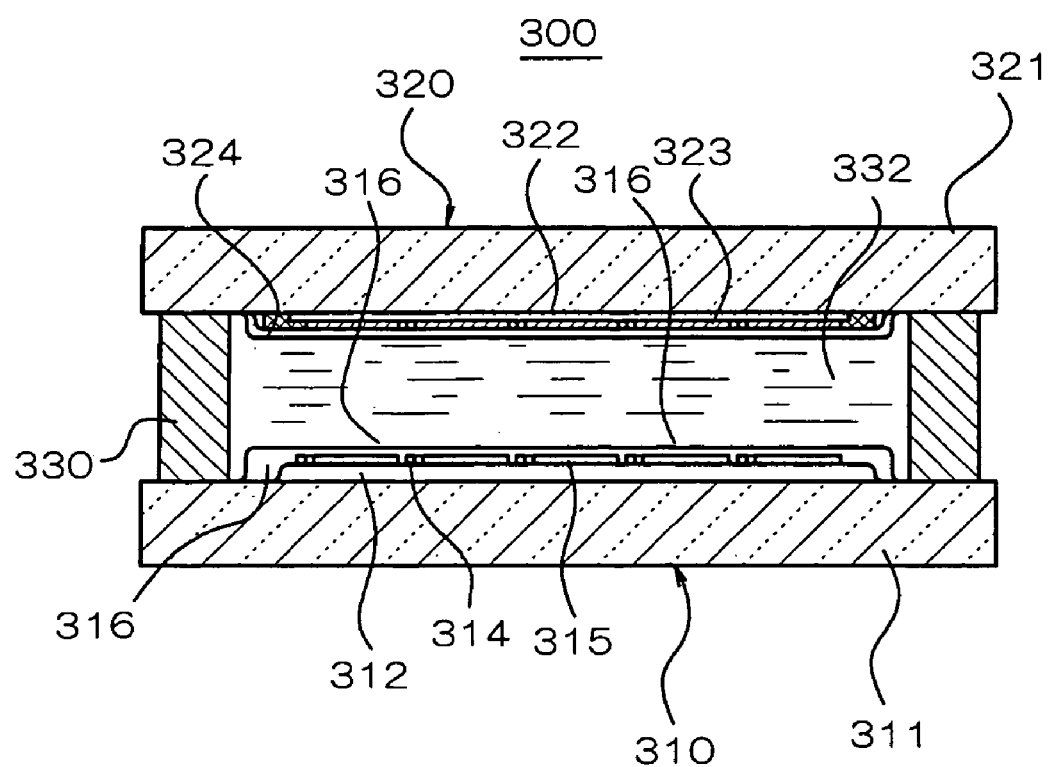
FIG. 14 is a schematic longitudinal sectional view showing a liquid crystal display device according to an eighth embodiment of the present invention.

In the substrate 310 for an electro-optical device, a base layer 312 having the same uneven surface shape as the base layer described above and a pixel electrode 315 which also functions as the reflective film are provided on the inner surface of the substrate 311 as shown in FIG. 14. Also, an alignment film 316 is formed thereon. Furthermore, on the inner surface of the substrate 310 for an electro-optical device, a plurality of scanning lines 313 shown as a dotted line in FIG. 15 and a plurality of data lines 314 of which cross-sections are shown in FIGS. 14 and 15 are formed to extend across each other.

As shown in FIG. 15, a thin film transistor (TFT) 310T is provided in a lower layer of the pixel electrode 315. In the thin film transistor 310T, a semiconductor layer having a channel region 310c, a source region 310s, and a drain region 310d are provided. The channel region 310c is disposed oppositely to the gate electrode 310g electrically connected to the scanning line 313 via an insulating film. The source region 310s is electrically connected to the data line 314. The drain region 310d is electrically connected to the pixel electrode 315. In addition, the structure of the thin film transistor 310T is not limited by a reverse stagger structure shown in the figure, but may be a structure that the gate electrode is disposed on the channel layer or a lightly doped drain (LDD) structure.

As shown in FIG. 14, in the opposite substrate 320, an opposite electrode 322 made of a transparent conductive material such as an ITO is provided on the inner surface of the substrate 321. Then, a color filter is formed thereon such that an appropriate colored layer 323 is arranged in a predetermined array shape similar to the first embodiment. Furthermore, an alignment film 324 is formed thereon.

As shown in FIG. 15, in each pixel region, an inter-pixel region is provided. In the inter-pixel region, the base layer 312 and the pixel electrode 315 are not provided. In addition, in the pixel region, the base opening 312a is formed to have a slit shape extending in a direction perpendicular to the paper surface in the figure. In this embodiment, the base opening 312a where the base layer 312 is not provided extends continuously between the adjacent pixel regions. In other words, the base opening 312a extends continuously between the adjacent pixel regions in a direction perpendicular to the paper surface in the figure. More specifically, the base opening 312a extends across the pixel electrode 315 in a direction perpendicular to the paper surface in FIG. 15(a) (that is, a vertical direction in FIG. 15(b)). In addition, in the position overlapped with the base opening 312a in plan view, there is provided a transmissive opening 315a where the reflective film 315 is not formed. Therefore, similar to other embodiments, it is possible to prevent the exfoliation of the base layer 312 according to the present embodiment. However, the transmissive opening 315a does not extend entirely across the pixel electrode 315, but is connected to the pixel electrode 315 through a pixel interconnection section 315b in a single body.

In the liquid crystal display device 300 constructed as described above, a voltage supplied through the data line 314 is supplied to the pixel electrode 315 in the pixel selected by the scanning line 313, and then an alignment condition changes corresponding to an electric field generated between the pixel electrode 315 and the opposite electrode 322, thus producing desired images.

In this regard, an active-matrix type liquid crystal display device according to the present invention is not limited by those in which the thin film transistor (TFT) is used as a switching element as described above, but also includes those in which a thin film diode (TFD) is used as a switching element.

As well as the liquid crystal display device described above, the electro-optical device according to the present invention can be applied to a variety of fields such as an electro-luminescence device, an organic electro-luminescence device, a plasma display device, an electrophoresis display device, and an electron emission device such as a field emission display and a surface-conduction electron emitter display.

NINTH EMBODIMENT

Electronic Apparatus

Figure 16:
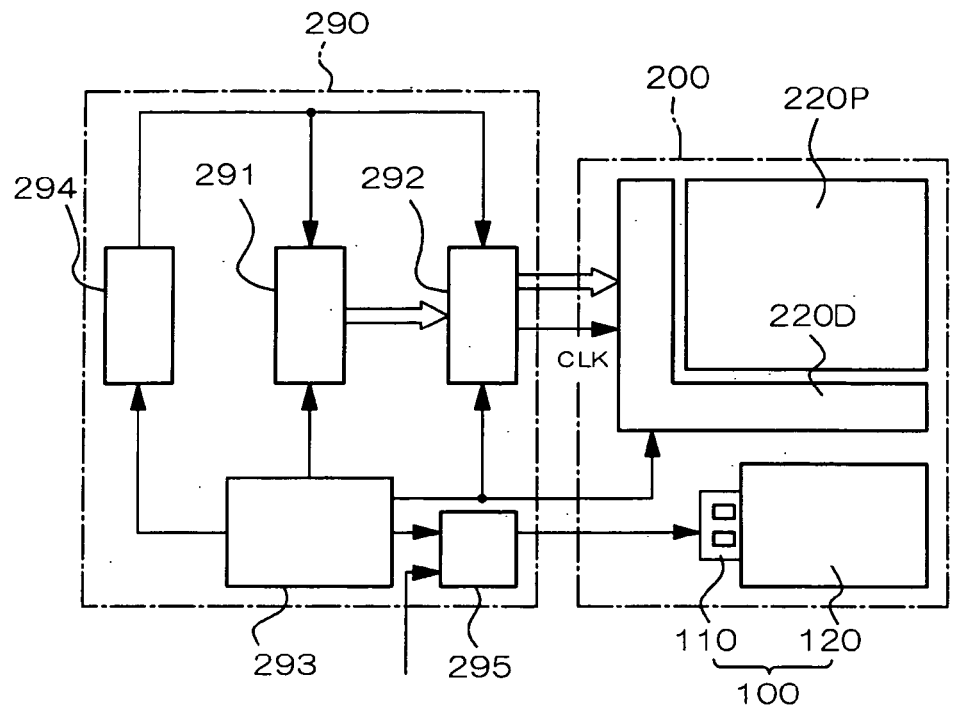
FIG. 16 is a schematic block diagram showing an electronic apparatus according to a ninth embodiment of the present invention.

Finally, an electronic apparatus according to a ninth embodiment of the present invention will be described with reference to FIGS. 16 and 17. Description of this embodiment will be given to an electronic apparatus having the electro-optical device (the liquid crystal display device 200) described above as a display means. FIG. 16 is a schematic block diagram showing an entire construction of a control system (a display control system) of the liquid crystal display device 200 of the electronic apparatus according to the ninth embodiment of the present invention. The electronic apparatus shown here comprises a display control circuit 290 in which a display data output source 291, a display data processing circuit 292, a power supply circuit 293, a timing generator 294, and a light source control circuit 295 are provided. In addition, the liquid crystal display device 200 comprises a driving circuit 220D for driving the liquid crystal panel 220P having the construction described above. The driving circuit 220D may be, for example, an electronic component (for example, a semiconductor IC261) mounted on the liquid crystal panel 220P described above. However, beside the construction described above, the driving circuit 220D may be, for example, a circuit pattern provided on the panel surface, or a semiconductor IC chip or a circuit pattern mounted on a circuit substrate electrically connected to the liquid crystal panel.

The display data output source 291 comprises a memory such as a ROM (Read Only Memory) or a RAM (Random Access Memory), a storage unit such as a magnetic recording disc or an optical recording disc, and a tuning circuit for tuning and outputting digital image signals, such that the display data can be supplied to the display data processing circuit 292 by using a predetermined format of image signals based on various clock signals generated from the timing generator 294.

The display data processing circuit 292 comprises a variety of circuits, such as a serial-parallel conversion circuit, an amplification inversion circuit, a rotation circuit, a gamma correction circuit, and a clamp circuit, such that input display data are processed to supply image data to the driving circuit 220D along with clock signal CLK. The driving circuit 220D comprises a scanning line driving circuit, a signal line driving circuit, and an inspection circuit. The power supply circuit 293 supplies a predetermined level of voltage to each component described above.

The light source control circuit 295 supplies the power from a power supply circuit 293 to a light source unit 110 in a lighting device 100 based on a control signal input from an external. The light output from the light source unit 110 is incident to a light-guiding plate 120 and then output from the light-guiding plate 120 to the liquid crystal panel 220P. The light source control circuit 295 controls turn on/off the light source of the light source unit 110 according to the control signal. Furthermore, brightness of each light source may be controlled.

Figure 17:
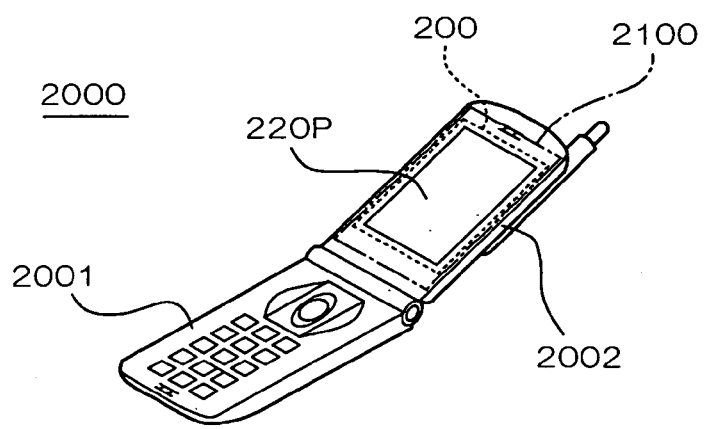
FIG. 17 is a schematic perspective view showing an electronic apparatus according to a ninth embodiment of the present invention.
Figure 18:
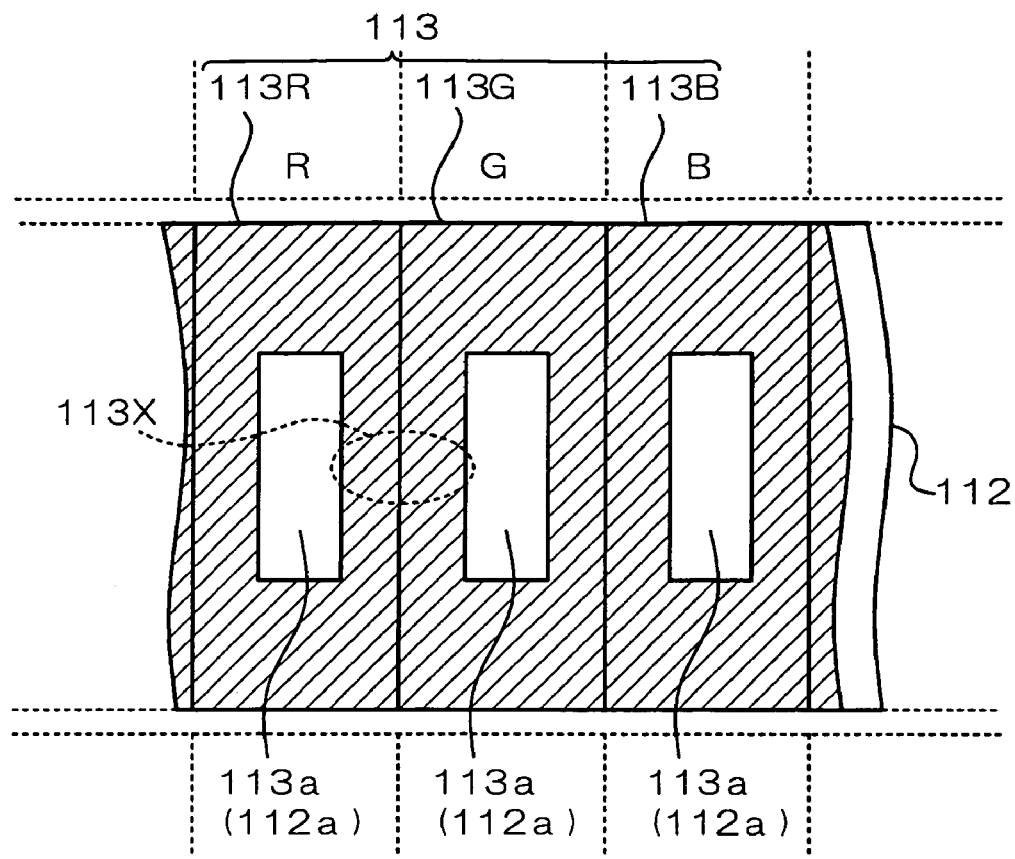
FIG. 18 is an enlarged sectional view showing a pattern in a pixel of a conventional liquid crystal display device.
Figure 19:
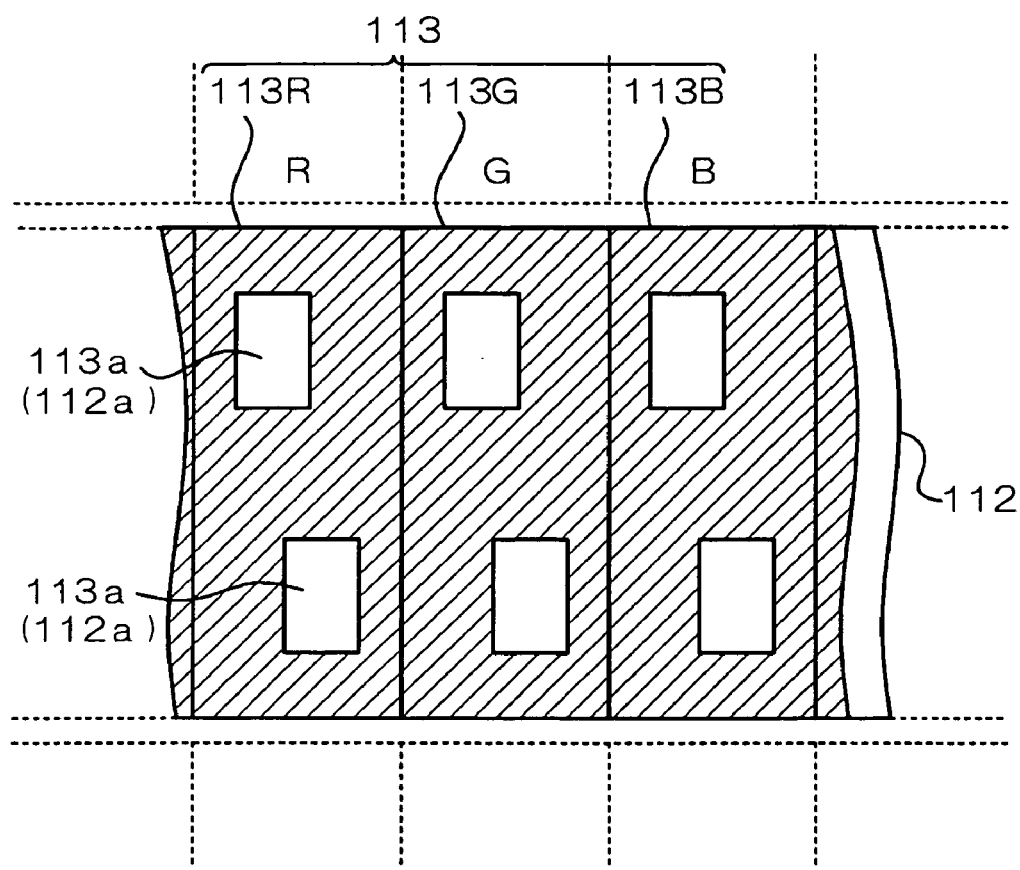
FIG. 19 is an enlarged plan view showing a pattern in a pixel of another conventional liquid crystal display device.

FIG. 17 is a schematic perspective view showing an exterior appearance of a mobile phone, which is an electronic apparatus according to an embodiment of the present invention. The electronic apparatus 2000 comprises an operation unit 2001 and a display unit 2002, and a circuit substrate 2100 is provided inside the display unit 2002. The liquid crystal display device 200 is mounted on the circuit substrate 2100. Also, the electronic apparatus is constructed such that the liquid crystal panel can be viewed on the surface of the display unit 2002.

What is claimed is:

1. A substrate for an electro-optical device, comprising:
   a base layer on the substrate;
   a reflective film on the base layer;
   a plurality of pixel regions in a region including the reflective film and the base layer;
   a transmissive opening formed in the reflective film on each pixel region;
   a base opening formed in the base layer and arranged in a position overlapped with the transmissive opening in plan view;
   wherein the base opening extends continuously in a first direction into adjacent pixel regions, the base opening including a first edge extending substantially parallel to the first direction and a second edge opposite the first edge, the second edge having portions extending in a second direction substantially perpendicular to the first direction thereby varying the size of the base opening along the first direction.

2. The substrate for an electro-optical device according to claim 1,
   wherein the base layer has an uneven surface, and
   wherein the reflective film has a light scattering surface corresponding to the uneven surface.

3. The substrate for an electro-optical device according to claim 2, wherein edge portions of the base layer adjacent the base openings and supporting the reflective layer are substantially flat.

4. A method of manufacturing a substrate for an electro-optical device, in which a base layer and a reflective film are deposited on the substrate and a plurality of pixel regions including the base layer and the reflective film are arranged, the method comprising the steps of:
   forming the base layer such that a base opening where the base layer is not formed is provided in each pixel region, and the base opening extends continuously in a first direction into adjacent pixel regions, the base opening including a first edge extending substantially parallel to the first direction and a second edge opposite the first edge, the second edge having portions extending in a second direction substantially perpendicular to the first direction thereby varying the size of the base opening along the first direction; and
   forming the reflective film such that a transmissive opening where the reflective film is not formed is overlapped with the base opening in plan view.

5. The method of manufacturing a substrate for an electro-optical device according to claim 4, wherein, in the step of forming the base layer, a photosensitive resin is exposed by using a predetermined mask and then developed, so that the base layer has an uneven surface.

6. An electro-optical device comprising:
   an electro-optical layer;
   a reflective film arranged opposite to the electro-optical layer;
   a base layer arranged on a side of the reflective film opposite to the electro-optical layer;
   a plurality of pixel regions provided in a region including the electro-optical layer and the reflective film;
   a transmissive opening formed in the reflective film on each pixel region; and
   a base opening formed in the base layer and arranged in a position overlapped with the transmissive opening in plan view;
   wherein the base opening extends continuously in a first direction into adjacent pixel regions, the base opening including a first edge extending substantially parallel to the first direction and a second edge opposite the first edge, the second edge having portions extending in a second direction substantially perpendicular to the first direction thereby varying the size of the base opening along the first direction.

7. The electro-optical device according to claim 6,
   wherein the base layer has an uneven surface, and
   wherein the reflective film has a light scattering reflective surface corresponding to the uneven surface.

8. The electro-optical device according to claim 7,
   wherein edge portions of the base layer adjacent the base openings and supporting the reflective layer are substantially flat.

9. A method of manufacturing an electro-optical device including an electro-optical layer, a reflective film arranged opposite to the electro-optical layer, a base layer arranged adjacent to the reflection film on a side opposite to the electro-optical layer, and a plurality of pixel regions provided in a region including the electro-optical layer and the reflective film, the method comprising the steps of:
   forming the base layer having an uneven surface such that the base layer is provided in each pixel region and has a base opening extending continuously in a first direction into adjacent pixel regions, the base opening including a first edge extending substantially parallel to the first direction and a second edge opposite the first edge, the second edge having portions extending in a second direction substantially perpendicular to the first direction thereby varying the size of the base opening along the first direction; and
   forming the reflective film having a light scattering surface corresponding to the uneven surface on the base layer, such that a transmissive opening is provided on the reflective film in a position overlapped with the base opening in plan view.

10. The method of manufacturing an electro-optical device according to claim 9, wherein, in the step of forming the base layer, a photosensitive resin is exposed by using a predetermined mask and then developed, so that the base layer has an uneven surface.

* * * * *